United States Patent [19]

Nagrotzki

[11] 4,215,452

[45] Aug. 5, 1980

[54] DEVICE FOR NOBBING AND GUTTING FISH

[75] Inventor: Karl-Heinz Nagrotzki, Lübeck, Fed. Rep. of Germany

[73] Assignee: Nordischer Maschinenbau Rud. Baader GmbH & Co. KG, Lübeck, Fed. Rep. of Germany

[21] Appl. No.: 966,813

[22] Filed: Dec. 6, 1978

[51] Int. Cl.³ ............................................. A22C 25/14
[52] U.S. Cl. ............................................. 17/60; 17/63
[58] Field of Search ................... 17/60, 63, 54, 55, 58, 17/59

[56] References Cited

U.S. PATENT DOCUMENTS

| | | | |
|---|---|---|---|
| 1,539,300 | 5/1925 | Christiansen | 17/60 |
| 2,483,508 | 10/1949 | Smith | 17/60 |
| 2,529,800 | 11/1950 | Erickson | 17/63 |
| 3,123,853 | 3/1964 | Radloff et al. | 17/63 |
| 3,843,998 | 10/1974 | Wenzel | 17/60 |

FOREIGN PATENT DOCUMENTS 1454081 11/1968 Fed. Rep. of Germany ............. 17/63

Primary Examiner—Willie G. Abercrombie
Attorney, Agent, or Firm—Edward F. Levy

[57] ABSTRACT

A device for nobbing and gutting fish comprises an endless conveyor of fish troughs for receiving fish lying on their sides, cutting tools to cut into the fish closely behind their collar bones, and retention means for the fish bodies during the extraction of the intestines arranged downstream of the cutting tools. The retention means comprises a lower retention bar, rising above the bottoms of the fish troughs and an upper retention face, a gap being formed between the retention bar and the retention face. Of the retention means at least the retention face is biased to yield in a common plane of the retention face and the retention bar, so that the gap between these elements may be adapted according to varying sizes of the fish to be treated.

4 Claims, 1 Drawing Figure

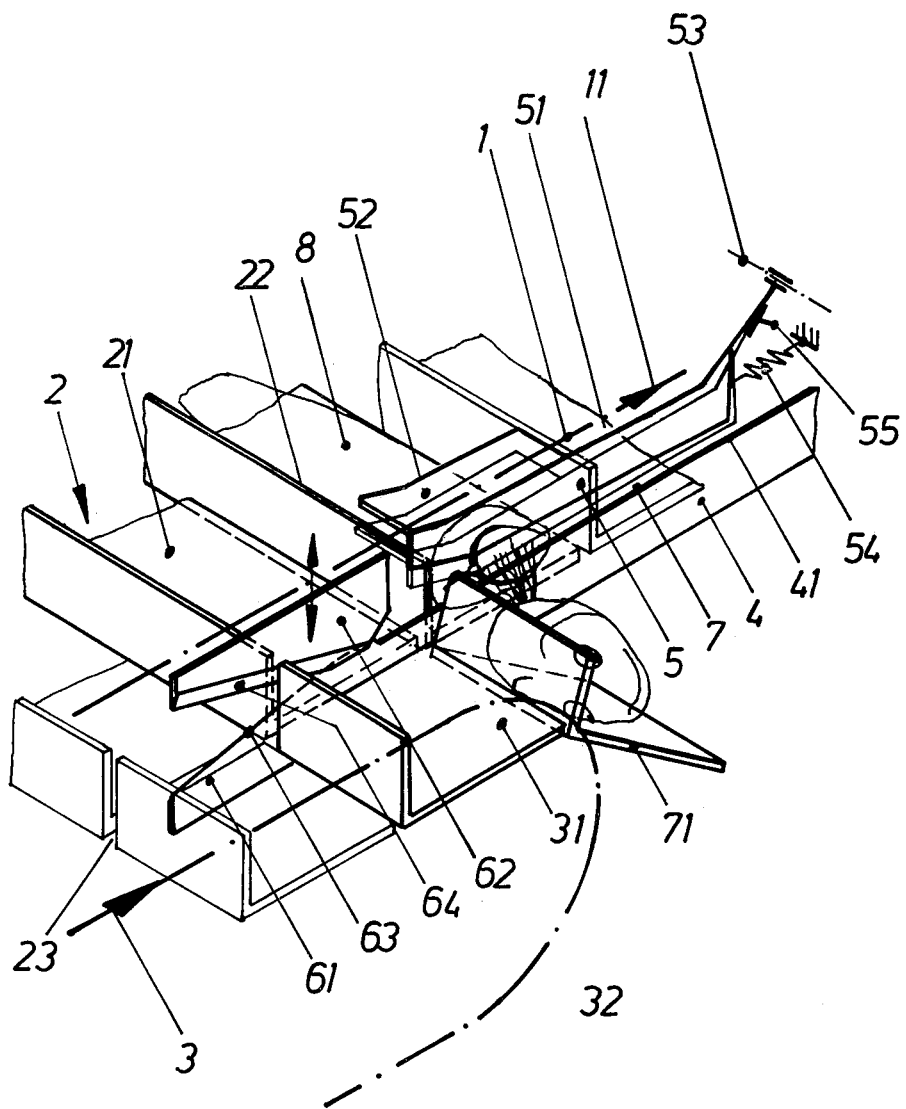

DEVICE FOR NOBBING AND GUTTING FISH

BACKGROUND OF THE INVENTION

1. Field of the Invention

The invention relates to a device for nobbing and gutting fish, comprising an endless conveyor carrying fish troughs to receive fish lying on their sides, cutting tools arranged adjacent the head ends of said troughs and adapted to cut into the fish from both sides of their backbones closely behind their collar bones, and means for retaining the bodies of the fish by their head ends during the extraction of the entrails and arranged downstream of said cutting tools when seen in the conveying direction of said troughs.

2. Description of Prior Art

British Pat. No. 673 398 discloses a machine for cleaning fish in which a pair of stationary knives for cutting into the fish from both sides of their backbones closely behind the head is arranged adjacent the head ends of the troughs of an endless conveyor for conveying fish lying on their sides, these knives lying in a vertical plane and converging with their cutting edges. Downstream of the troughs when seen in the conveying direction there is provided a plate for retaining the fish in the troughs while the heads are being extracted. At its lower edge this plate is provided with a recess for the passage of the entrails of fish.

This machine is designed as a nobbing machine for decapitating and cleaning herrings of uniform size. It is possible to adapt the height of the plate manually according to varying thicknesses and thus sizes of the fish. However, this machine shows the disadvantage that the recess of the plate is too small for the passage of a well-filled gullet or stomach of predatory fish. If the recess is made larger the plate will not be able to retain the bodies of smaller fish so that these may slip underneath the plate without being held in the troughs. In addition, it is disadvantageous that when retaining a fish the plate will only engage the upper edge of it, which may be of particular negative effect in the case of soft fish.

3. Object of the Invention

It is one of the main objects of the invention to improve the known machine in a manner suited to avoid its disadvantages and to enable the cleaning of fish of varying consistencies and sizes as well as of different species without necessitating any manual adjustment or re-adjustment.

SUMMARY OF THE INVENTION

According to the invention there is provided a device for nobbing and gutting fish, comprising an endless conveyor carrying fish troughs to receive fish lying on their sides, cutting tools arranged adjacent the head end of said troughs and adapted to cut into the fish from both sides of their backbones closely behind their collar bones, and means for retaining the bodies of the fish by their head ends during the extraction of the entrails and arranged downstream of said cutting tools when seen in the conveying direction of said troughs, wherein said retention means for the bodies of the fish comprise a lower retention bar rising above the bottoms of said troughs and an upper retention face leaving a gap to said retention bar and lying in a common plane with the same, at least said retention face being arranged to yield against force in said common plane.

Substantial advantages achieved thereby lie in the fact that it is possible to extract the gullet and/or the stomach from the belly cavity of each fish without there being any resistance or obstacles outside the belly cavity, each fish being retained in a safe and careful manner while the entrails are being extracted or while in certain cases the heads are being torn off, together with the intestines.

According to a preferred embodiment of the invention the retention face is mounted to pivot about a horizontal pivotal axis in an upward direction and is connected to feeler means sensing the upper side of the fish. This enables an automatic adaptation in the case of fish of different thicknesses resp. sizes.

Preferably, said feeler means may be arranged as a sliding face rising from the upper edge of the retention face laterally above the fish troughs. Such an arrangement guarantees a simple construction of the upper retention means and a safe retention of the fish by means of the upper side of the fish body.

According to yet another embodiment of the invention spring means are provided as particularly simple constructive elements for allowing a yielding against force of at least the retention face.

BRIEF DESCRIPTION OF THE DRAWING

Other and further objects of the present invention will be apparent from the following description and claims and are illustrated in the accompanying drawing which by way of illustration shows a preferred embodiment of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

The drawing shows a schematic axonometric view of a device constructed in accordance with the present invention.

DESCRIPTION OF THE PREFERRED EMBODIMENT

In a machine frame (not shown) an endless conveyor 1 is driven in a conveying direction 11 by suitable drive means (not shown) and turns about two idler rollers (not shown). The conveyor is provided with fish troughs 2 arranged transversely of the conveying direction 11. Adjacent this endless conveyor 1 there is arranged a head conveyor 3 running in synchronism with the endless conveyor 1. The head conveyor 3 carries head troughs 31, lying in the projection of the fish troughs 2 and comprises a turning station 32 lying upstream of the—not shown—turning station of the endless conveyor 1. Each fish trough 2 has a bottom 21 for the fish body to rest thereon and a rear wall 22 rising transversely of the conveying direction 11, this rear wall 22 serving as a rest for the belly or backside of the fish body. The head troughs 31 have a shape corresponding to that of the fish troughs 2. Upstream of the turning station 32 of the head conveyor 3 there is provided a pair of knife rails 61 and 62 within a slot 23 between the fish troughs 2 and the head troughs 31. The lower knife rail 61 is mounted stationary and has a cutting edge 63 rising in the conveying direction of the fish troughs 2. The upper knife rail 62 is displaced some 100 micrometers with relation to the lower knife rail 61, has a cutting edge 64 declining in the conveying direction of the fish troughs 2, and is driven in a suited manner to oscillate in a vertical plane. Thus the two knife rails 61 and 62 cooperate scissor-like. In the projection of the lower knife rail 61 there is arranged a stationary retention bar 4 adjacent the head ends of the fish troughs 2. With its upper edge 41 this retention bar 4 rises to approximately half of the height of the rear walls of the fish troughs 2. Also in the slot 23 and above the retention bar 4 but in the same plane with the latter there is arranged a retention face 5 to pivot upwardly against the force of a spring 54 about a pivot axis 53 lying transversely the conveying direction 11. The retention face 5 is held above the upper edge 41 of the retention bar 4 leaving a gap 7 therebetween by means of a stop 55. At its free end the retention face 5 carries a feeler member 52 extending above the path of the fish troughs 2.

The operation of the device is as follows:

A fish 8 which is to be nobbed and cleaned is placed with its body in a fish trough 2 such that its head together with the collar bones rests in a head trough 31 adjacent the fish trough 2. Upon advancement of the troughs in the conveying direction 11 the fish arrives in the working reach of the lower and upper knife rails 61 and 62, which cut into the fish body from each side closely behind the collar bones. The backbone of the fish is severed by the scissor-like co-acting parts of the cutting edges 63 and 64. The gullet of the fish remains undamaged and, upon further advance of the fish troughs 2, reaches the gap 7, while the separated head of the fish 8 is conveyed in a downward direction by the head trough 31 turned downwardly at the turning station 32. In the meantime, the body of the fish has arrived at the retention face 5 and lifted the feeler member 52 fixed thereto, the gap thus having been increased considerably. When the gullet is being extracted from the belly cavity by pulling the tearing action exerted on the head away through the downwardly turning head trough designated 71 the gap 7 leaves sufficient room for this purpose while the cut faces on the fish body produced by the knife rails 61 and 62 rest against the retention bar 4 resp. the retention face 5 so that the fish body is retained by these against the forces or tension exerted by the extraction of the gullet, the stomach and the intestines.

Apart from the processing of sardines and herrings a device according to the present invention makes possible the extracting of the intestines of trouts and mackerels from their belly cavities, the gullets of which species are often tautly stuffed.

What is claimed is:
1. A device for nobbing and gutting fish, comprising
   (a) an endless conveyor carrying fish troughs to receive fish lying on their sides,
   (b) cutting tools arranged adjacent the ends of said troughs carrying the head of the fish and adapted to cut into the fish from both sides of their backbones closely behind their collar bones, and
   (c) means for retaining the rumps of the fish by their severed edges where the head has been cut off and arranged downstream of said cutting tools when seen in the conveying direction of said troughs, said retention means being adapted to dip into the plane of said cuts to retain the fish bodies during the extraction of the entrails, and comprising
   (d) a lower retention bar raising above the bottoms of said troughs and
   (e) an upper retention face spaced above said retention bar and forming a gap therebetween, said upper retention face lying in a common plane with said retention bar,
   (f) at least said retention face being arranged to yield against force in said common plane.
2. A device as claimed in claim 1, wherein spring means are provided for biasing at least said retention face.
3. A device as claimed in any of claims 1 or 2, wherein said retention face is mounted to pivot about a horizontal pivotal axis in an upward direction and is connected to feeler means sensing the upper side of the fish.
4. A device as claimed in claim 3, wherein said feeler means is arranged as a sliding face rising from the upper edge of said retention face laterally above the fish troughs.

* * * * *